Patented Sept. 5, 1922.

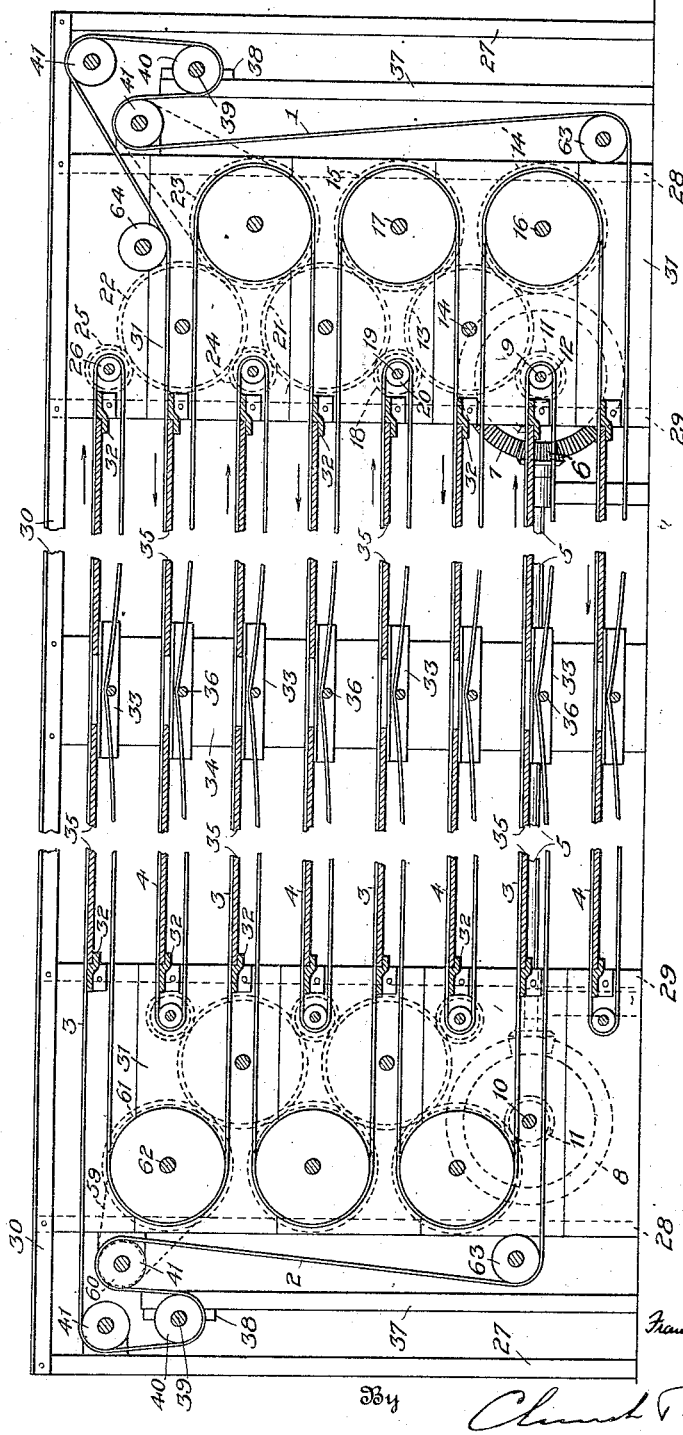

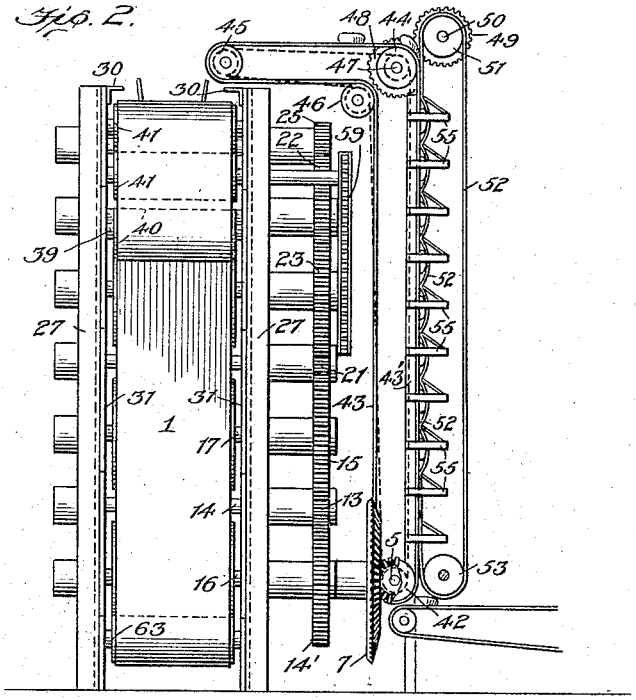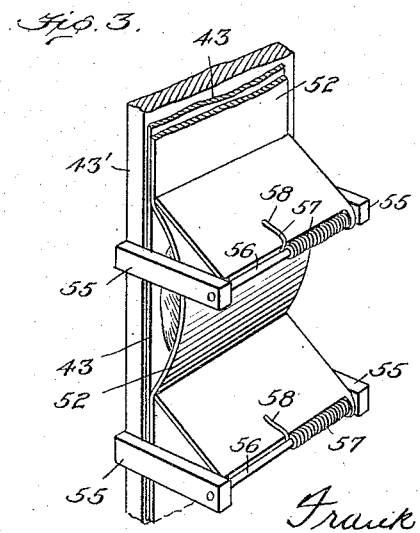

1,427,869

UNITED STATES PATENT OFFICE.

FRANK H. VAN HOUTEN, OF BEACON, NEW YORK, ASSIGNOR TO DUTCHESS TOOL COMPANY, OF BEACON, NEW YORK, A CORPORATION OF NEW YORK.

PROOFER BELT.

Application filed April 17, 1918. Serial No. 229,125.

*To all whom it may concern:*

Be it known that I, FRANK H. VAN HOUTEN, a citizen of the United States, residing at Beacon, in the county of Dutchess and State of New York, have invented certain new and useful Improvements in Proofer Belts; and I do hereby declare the following to be a full, clear, and exact description of the same, reference being had to the accompanying drawings, forming part of this specification.

This invention relates to belts for use in the proofing room of a bakery and the principal object of the invention is the provision of a set of belts which will form a simple and more efficient system of dough proofing than the known devices, this invention being particularly an improvement on the dough-proofing cabinet shown in my prior Patent No. 1,115,621 of November 3, 1914.

A further object of the invention is the substitution of a single pair of belts for the large number of belts shown in my prior patent, the substitution making it possible to automatically tighten the two belts and to avoid the often excessive tightness rendered necessary in the older systems in order to cause the belt to adhere sufficiently to the driving roll to be propelled with its load. In the present system there are two driving rolls for each reach of the belts, so that there is no occasion for the undue tightness of the former machines.

A further object of the invention is to provide an improved vertical elevator for delivering the balls of dough to the main proofer belts, the improvement consisting of the provision of spaced presser fingers for yieldably maintaining the slack belt in contact with the taut belt and pressing both against the backing for the latter.

The invention consists in the combination and arrangements of the parts hereinafter described and particularly pointed out in the appended claims.

Referring now to the accompanying drawings,—

Fig. 1 is a vertical longitudinal section through the two main proofer belts;

Fig. 2 is an end elevation of the device, showing particularly the auxiliary belts; and Fig. 3 is a perspective view of a portion of the vertical elevator, and showing two of the spring-pressed fingers.

The proofing cabinet illustrated as forming the preferred construction of my invention in accordance with the present invention follows the unit scheme of the proofing cabinet of my prior patent to permit maximum economy and convenience in manufacturing the various parts, but replaces the considerable number of belts by two similar endless belts 1 and 2 each provided with a gravity acting tension device hereinafter more particularly described.

These belts 1 and 2 may be identical in every respect, but are illustrated with the slight differences which are found advisable. As shown, the belts form alternate reaches 3 and 4 for conveying the balls of dough back and forth from one end of the cabinet to the other for the time requisite for proper proofing of the dough, the speed of the belts being that best suited to the capacity of the bakery mechanism and the number of reaches and the length of each being interdependently determined by the time for proofing and the selected belt speed, the greater the number of reaches the less the length of each reach, the length of the belts being dependent upon these two factors.

The driving mechanism for the two belts will now be described. Power is applied to the shaft 5 in any desired manner and is transmitted through pinion 6 on each end of shaft 5 to large bevel gears 7 and 8 on shafts 9 and 10. Shaft 9, in addition to gear 7, carries a small gear wheel 11 and a small drive roll 12 which drives the lowermost reach of belt 2. Gear wheel 11 drives the entire series of gears on one side of the machine, meshing with the idler 13 on shaft 14 which directly drives large gear wheels 14′ and 15 on shafts 16 and 17 and also a smaller gear wheel 18 on shaft 19, the latter shaft carrying a drive roll 20 similar to roll 12. The units above this set are similar, the drive being positive through idlers 21 and 22 to large gear 23 and small gears 24 and 25, the latter driving the upper reach of belt 2, by means of a drive roll 26 similar to 12 and 20.

The framework supporting these gears and rolls is made up of uprights 27, 28 and 29 joined by longitudinal angle irons 30 at their upper ends and secured to the base or floor in any desired manner. Uprights 28 and 29 carry the unit panels 31 each panel forming the bearing plate for a shaft for one of each of the three kinds of gears, one large and one small gear wheel and an idler, it being understood that the shafts on which these gear wheels are mounted each carry a roll for driving the belt, the smaller rolls driving the upper or working stretch of a reach of the belt and each larger roll driving the lower non-conveying stretch. These unit panels 31 are each provided on their inner edge with two transverse brackets 32 which co-operate with longitudinal brackets 33 on central uprights 34 for holding in place the backing plates 35 for supporting the upper stretches of the belts. These backing plates 35 are readily detachable and replaceable, and each supports a conveying reach of one of the belts, each reach, as previously stated, having two driving rolls, so that there are twice as many driving rolls as there are reaches. There will be as many sets of uprights 34 as are rendered necessary by the length of the cabinet. A rod 36 preferably connects the members of each pair of central uprights for each reach of the belt and also serves to support the lower stretch of the belt. These rods may be provided with roller sleeves if desired.

Between the uprights 27 and 28 is located a pair of vertical guides 37 in which freely slides a pair of journals 38 for a shaft 39 carrying a tightening roller 40 which by its weight maintains a suitable tension on the belt and holds it securely against the driving rolls, the entire weight of the roller and its journal being supported by the belt alone. From the tightening roller 40 the belt passes to idle rolls 41 guiding the belts to the proper horizontal location. When the belt stretches the tightening roller sinks by gravity and keeps the belt taut at all times. When the roller 40 has reached nearly the bottom of the guides 37 the belt is shortened sufficiently to again bring the roll 40 to the top of its upright guide.

Between the pinions 6 of the shaft 5 carries a belt roll 42 driving a tight belt 43 which passes vertically upward from roll 42 along a vertical backing board 43' to a roll 44 and thence horizontally to roll 45 located directly over the top reach of belt 2 near its left side as viewed in Fig. 1. The belt 43 passes from this roll back to the drive roll 42, passing over roll 46 in proximity to roll 44. The latter roll is carried on a shaft 47 on which is secured a gear wheel 48 meshing with gear wheel 49 on shaft 50 which carries drive roll 51 for the loose belt 52 which extends around a roll 53 located near drive roll 42.

In order to keep these two belts 43 and 52 in contact the backing board 43' is provided with a plurality of arms 55, carrying at their outer ends a rod 56 on which is pivotally mounted a board or presser finger yieldably held in place against the belts by either a weight or by a spring 57 preferably surrounding the rod 56 and having one end 58 engaging the presser finger, while the other end is held in place by the arm 55. These fingers are the same width as the belt, and, as the dough is carried up between the two belts, these fingers form pockets in the outer belt which is left slack enough to form these pockets without pressing too hard against the dough.

One of the idler rolls for each of the main belts is driven, preferably the roll 41 between the tightener roll 40 and the unit sections 31, the drive being had by means of a sprocket chain 59 passing over sprocket wheel 60 and driven by sprocket wheel 61 on shaft 62.

A lower roll 63 is provided to maintain the bottom stretch of the lower reach of each belt horizontal, and an additional roll 64 is required on the lower of the two main belts, in this case belt 1 to lower the upper reach to keep it horizontal and yet permit the tightener roller 40 to rise to the same height on each side. It will be noted that while only one of the guide rolls on each side is driven, all the other rolls are positively driven, thus insuring maximum efficiency of the device.

What is claimed is:

1. In a proofing apparatus, the combination of two endless belts, each consisting of a plurality of parallel reaches, certain of the reaches of either belt being parallel to, spaced from and overlapping the adjacent reaches of the other belt, and yieldable means for holding each of said belts taut.

2. An endless belt consisting of a plurality of conveying reaches and a plurality of driving rolls therefor, the number of driving rolls exceeding the number of reaches.

3. An endless belt consisting of a plurality of conveying reaches and a plurality of driving rolls therefor, the number of driving rolls being double the number of reaches.

4. A unit for an expansible proofing machine of the type using two belts having alternate reaches, said unit including a small roll for supporting a reach of one of said belts, a large drive roll for supporting a reach of the other of said belts, a pair of paced members in which said rolls are mounted, and means also mounted in said members for transmitting motion to said drive roll.

5. A unit for an expansible proofing machine of the type using two belts having alternate reaches, said unit including a small drive roll for supporting a reach of one of said belts, a large drive roll for supporting a reach of the other of said belts, a pair of spaced members in which said drive rolls are mounted, and means also mounted in said members for transmitting motion to said drive rolls.

6. A unit for an expansible proofing machine of the type using two belts having horizontal alternate reaches, said unit including a small roll for supporting a reach of one of said belts, a second roll having its axis parallel to the axis of the first mentioned roll and lying in the same horizontal plane therewith, said second roll supporting a reach of the other of said belts, a pair of spaced members in which said rolls are mounted, and means also mounted in said members for transmitting motion to one of said belts.

7. A unit for an expansible proofing machine of the type using two belts having alternate reaches, said unit including a plurality of parallel panels supporting between them a drive roll for one of said belts, a smaller roll for the other of said belts, and gearing for transmitting power to said drive roll from the roller of an adjacent unit.

8. In an expansible proofing machine of the type using two separate belts, a frame, a plurality of rolls mounted in said frame, and a plurality of interchangeable units, each of said units including a plurality of spaced members carrying a roll for one of said belts, a smaller roll for the other of said belts, and means for transmitting power from an adjacent unit to one of said rolls.

9. In an expansible proofing machine of the type using two separate belts, a frame, a plurality of rolls mounted in said frame, and a plurality of interchangeable units, each including a plurality of parallel panels supporting between them a drive roll for one of said belts, a smaller roll for the other of said belts, and gearing for transmitting power to said drive roll from the roll of an adjacent section.

10. An interchangeable unit for an expansible proofing machine of the type using parallel belt reaches for conveying the dough balls; said unit consisting of a plurality of rolls having their axes in a plane parallel to the plane of the conveying reaches, gearing for transmitting motion to said reaches, a plurality of transverse brackets for supporting backing plates for said conveying reaches, and means for supporting said rolls, said gearing and said brackets.

11. An expansible proofing cabinet consisting of a plurality of uprights, a plurality of panels secured to said uprights, transversely mounted rolls supported by certain of said panels, a plurality of unit panels secured to said uprights adjacent to the first mentioned panels, a plurality of belts, and rolls mounted between each pair of unit panels, said rolls dividing said belts into reaches, means for tensioning said belts, and means for driving certain of said rolls.

12. In an expansible proofing cabinet, a belt divided into a plurality of reaches, a plurality of superposed units, a drive roll for each reach mounted in each of said units, a second plurality of superposed units spaced horizontally from said first mentioned units, and a plurality of readily detachable and replaceable members between said sets of units for supporting said reaches and for spacing said sets of units the desired distance apart.

FRANK H. VAN HOUTEN.